United States Patent [19]

Ausburn

[11] Patent Number: 5,732,501
[45] Date of Patent: Mar. 31, 1998

[54] STUN GAFF FOR INCAPACITATING FISH

[76] Inventor: Kirk A. Ausburn, 440 Somerset Way, Ft. Lauderdale, Fla. 33326

[21] Appl. No.: 751,907

[22] Filed: Nov. 18, 1996

Related U.S. Application Data

[63] Continuation of Ser. No. 634,239, Apr. 18, 1996, abandoned.
[51] Int. Cl.⁶ .................................................. A01K 97/14
[52] U.S. Cl. ........................................... 43/5; 43/17.1
[58] Field of Search ....................... 43/5, 17.1, 6; 294/26

[56] References Cited

U.S. PATENT DOCUMENTS

| | | | |
|---|---|---|---|
| 2,805,067 | 9/1957 | Ryan | 273/106.5 |
| 3,083,491 | 4/1963 | Meysan et al. | 43/17.1 |
| 3,180,047 | 4/1965 | Kreutzer | 43/17.1 |
| 3,452,467 | 7/1969 | Makino | 43/17 |
| 3,484,665 | 12/1969 | Mountjoy et al. | 317/262 |
| 3,626,626 | 12/1971 | Blanc | 43/6 |
| 4,169,330 | 10/1979 | Schnur | 43/5 |
| 4,627,187 | 12/1986 | Williams | 43/17.1 |
| 4,667,431 | 5/1987 | Mendicino | 43/6 |
| 4,839,980 | 6/1989 | Hersom | 43/11 |
| 5,259,139 | 11/1993 | Ho et al. | 43/17.1 |
| 5,406,734 | 4/1995 | Ho et al. | 43/17.1 |

FOREIGN PATENT DOCUMENTS

| | | | |
|---|---|---|---|
| 666621 | 1/1929 | France. | |
| 782511 | 3/1934 | France. | |
| 1246312 | 7/1966 | Germany | 330/43 |
| 6511885 | 9/1965 | Netherlands | 43/17 |
| 148654 | 3/1959 | U.S.S.R. | 43/17.1 |

*Primary Examiner*—Jeanne Elpel
*Attorney, Agent, or Firm*—Richard M. Saccocio, P.A.

[57] ABSTRACT

A gaff for electrically incapacitating fish is disclosed. The gaff includes a handle and a hook. In a flying gaff, the hook is separable from the handle. In two embodiments, the gaff utilizes a piezoelectric sensor which when flexed by the weight of the fish produces a signal which activates a circuit which produces a stunning voltage across electrodes attached to the hook. Mechanical apparatus for activating the electric circuit are disclosed. Electrical circuitry diagrams are described which may be used with the piezoelectric sensor and the mechanical activation.

14 Claims, 3 Drawing Sheets

STUN GAFF FOR INCAPACITATING FISH

This application is a continuation of application Ser. No. 08/634,239, filed Apr. 18, 1996, now abandoned.

BACKGROUND OF THE INVENTION

1. Field of the Invention

This invention relates in general to the field of electrical fishing apparatus and in particular to the field of apparatus which will electrically stun and thereby momentarily incapacitate a large fish when brought alongside of a boat.

2. Description of the Prior Art

Once a fish is caught in open waters and brought alongside of a boat, it is necessary to bring the fish into the boat. Since many fishing boats have relatively high sides, it is not an easy task to secure the fish, lift it out of the water, and then lift it over the side of the boat and into the boat. There are a number of factors which makes this procedure even more difficult.

A large fish does not weigh much when submerged within the water. The buoyancy effect of the water actually makes the fish almost weightless when in the water. But out of the water the full weight of the fish must be contended with. It can readily be appreciated that a fish in the 25–100 pound category cannot easily be manhandled out of the water and into the boat. The posture of the person attempting the task adds to its difficulty. The person is usually leaning over the railing of the boat using only his arms and back. A proper and good weight lifting posture cannot be attained. The thrashing about of the fish further makes the task more difficult. It is not easy to manhandle a thrashing fish.

The rolling of the boat due to the seas makes the task of bringing a large fish into a boat even more difficult. In heavy seas, the boat could be moving up and down five or more feet. When all of these factors are combined, as usually occurs, the task is indeed difficult.

In the prior art the means most commonly used to bring a large fish into a boat is a gaff. A gaff consists of a handle having a "U" shaped member at one end. The end of the "U" shaped member is sharply pointed. The handle could be short, as little as one foot or long as much as ten feet. When using a gaff, the person assisting the fisherman must carefully place the point of the gaff into the fish at a location which will support the weight of the fish when lifted out of the water. Sufficient penetration of the point is also required.

Since gaffing a large fish is not intended to kill the fish, the fish continues to thrash about after being gaffed. Often, the thrashing by the fish and/or an insecure gaffing can cause the fish to fall off the gaff back into the water. This can and sometimes causes the fishing line to break, much to the dismay of the fisherman who has now lost the fish after finally finding, hooking, and reeling the fish alongside of the boat. Obviously, a more satisfactory apparatus would be beneficial.

Once a large fish is "safely" brought up out of the water and into a boat, other problems arise. Since the fish is alive and large, its natural survival instincts are to continue to thrash about which sometimes successfully, or unsuccessfully depending on how it is viewed, causes the fish to jump out of the boat back into the water. The thrashing fish can also be a danger to the people within the boat. It can cause chaos resulting in one or more of the fisherman being thrown overboard; it can cause physical injuries due to sharp teeth, sharp fins, sharp gills, and sharp scales. A thrashing about shark in a small boat is not a welcome happening.

Yet another factor involved when a fish is brought alongside is that it may be desirable to cause as little damage as possible to the fish so that the fish may be released and thereafter survive. Prior art gaffing of a large fish in heavy or even rolling seas can easily injure a fish, so that it will not survive if later released. Even when the fish is not to be released, it is desirable to cause as little physical injury to the fish when gaffed. If the fish is going to be killed, it would be morally correct to do so in a way which is least torturous to the animal. Prior art gaffing and subsequent clubbing is by no means a humane way of killing a fish.

In the prior art there exist a number of fishing lures, electric missile weapons, and repelling devices which rely on electric shock to immobilize or repel a fish. Apparently, the electrical stimulus affects an animal's nervous system to the extent of chasing the animal away or killing it. Between these limits depending upon the make-up of the animal's nervous system, the amount of the electrical shock, and the point of contact any number of varying results can occur. Very brief reversible immobilization can occur, lengthy immobilization which may or may not be reversible can occur, or permanent non-reversible immobilization can occur.

To date, the electrical shock technology has never been applied to fishing gaffs. Accordingly, it is a primary object of the present invention to provide a stun gaff which will electrically immobilize a fish when lifting it out of the water and into a boat.

Another object of the present invention is to provide a stun gaff which will automatically cause temporary or permanent immobilization of a fish during the initial stages of a gaffing procedure.

Another object of the present invention is to provide a stun gaff which is controllable by the operator as to time and magnitude of the electrical shock.

Another object of the present invention is to provide a stun gaff of the type which is commonly called a flying gaff.

Another object of the present invention is to provide a stun gaff which is reliable in a fresh or a salt water environment, and is not dangerous to the user.

The above-stated objects as well as other objects which, although not specifically stated, but are intended to be included within the scope the present invention, are accomplished by the present invention and will become apparent from the hereinafter set forth Detailed Description of the Invention, Drawings, and the Claims appended herewith.

SUMMARY OF THE INVENTION

The above objects as well as others are accomplished by the present invention which comprises a fishing gaff which produces an electrical shock sufficient to temporarily or permanently immobilize a fish when located alongside of a boat. In one embodiment, a piezoelectric sensor is attached to the gaff. When a fish is gaffed and a force is applied to begin lifting the fish out of the water, the piezoelectric sensor flexes and produces a voltage which triggers an electrical circuit, causing the stunning voltage to be applied to the fish. In a preferred embodiment, the power supply and the electrical circuitry are located within the upper part of the handle of the gaff while the piezoelectric sensor is attached to the lower portion of the handle. Switches are provided to connect the power supply to the electric circuit and to manually generate the stunning voltage pulse.

In another embodiment, the weight of the fish when pulling it out of the water causes relative axial motion between the hook end of the gaff and a coupling member attached to the handle of the gaff. In this embodiment, the hook member is biased by a spring to prevent the generation of the stunning voltage when the gaff is not being used. The piezoelectric or the mechanical activation apparatus may also be applied to a flying gaff.

DESCRIPTION OF THE PREFERRED EMBODIMENTS

Figure 1:
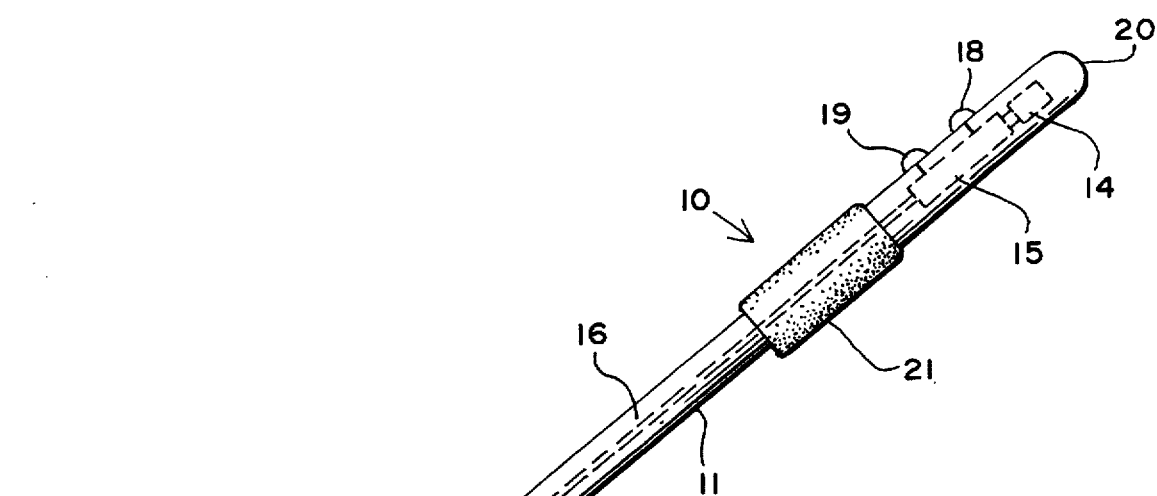
FIG. 1 schematically illustrates one embodiment of the inventive stun gaff wherein a piezoelectric sensor is used to automatically discharge a pulsed high voltage to electrically incapacitate a fish.

As required, detailed embodiments of the present invention are disclosed herein; however, it is to be understood that the disclosed embodiments are merely exemplary of the invention which may be embodied in various forms. Therefore, specific structural and functioning details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

FIG. 1 schematically illustrates one embodiment of the inventive stun gaff 10. In this embodiment the gaff comprises a handle portion 11, a hook portion 12, and a pair of electrical contacts 13 which are insulatingly mounted onto hook portion 12. A power source 14 which may, for example, comprise a 9-volt battery is connected to an electrical circuit 15, both of which are preferably but not necessarily mounted within the handle portion 11. Conducting wires 16 are used to connect the electrical circuit 15 to the electrical contacts 13.

A piezoelectric polymer film sensor 17 is shown affixed to the lower part of shaft 11 and electrically connected to the electric circuit 15 by conducting wires 16. Flexing of the sensor 17 creates a signal which triggers the electrical circuit 15, causing a high voltage discharge across contacts 13. Alternatively, the sensor 17 can be applied to any portion of the gaff 10 provided that gaffing of a fish results in flexing of the sensor 17. Switch 18 applies the battery 14 voltage to circuit 15. Switch 18 does not cause an electrical discharge across contacts 13. An additional switch 19 is provided to allow an operator to activate circuit 15 to cause an electrical discharge across contacts 13 independent of the activation by sensor 17.

The shape and details of the handle 11 and the gaff hook 12 may of course assume many variations in practice. The embodiment of FIG. 1 is only one of such variations. For example, in FIG. 1 the handle 11 may be made of flexible fiberglass having a tapered hollow configuration with an upper handle member 20 made of a corrosion-resistant metal. Upper handle member 20 may be appropriately attached to the fiberglass portion such as by screw threads or glue. Handle 11 may also include soft plastic foam grips 21 along the length of handle 11. Hook 12 may be slightly offset to assist in the flexing of the lower portion of handle 11 where the sensor 17 is attached. Hook 12 may be attached to handle 11 such as by threaded fasteners or any other appropriate method.

In operation, when a fisherman brings a fish alongside of a boat, switch 18 is activated and the fish is gaffed with stun gaff 10. The pointed end of hook portion 12 enters the fish causing electrical contacts 13 to come into contact with the flesh of the fish. When the gaff 10 is pulled upwardly, the weight of the fish causes flexing of the handle 11 which in turn causes flexing of sensor 17. A high voltage pulse is then discharged through contacts 13 resulting in momentarily incapacitating the fish which then may be safely brought into the boat. If the initial electrical discharge pulse is insufficient to completely stun the fish, switch 19 may be used to provide a pulse of longer duration. The pulse may continue until switch 19 is released. Switch 19 may alternatively activate a single or series of timed pulses.

Figure 2:
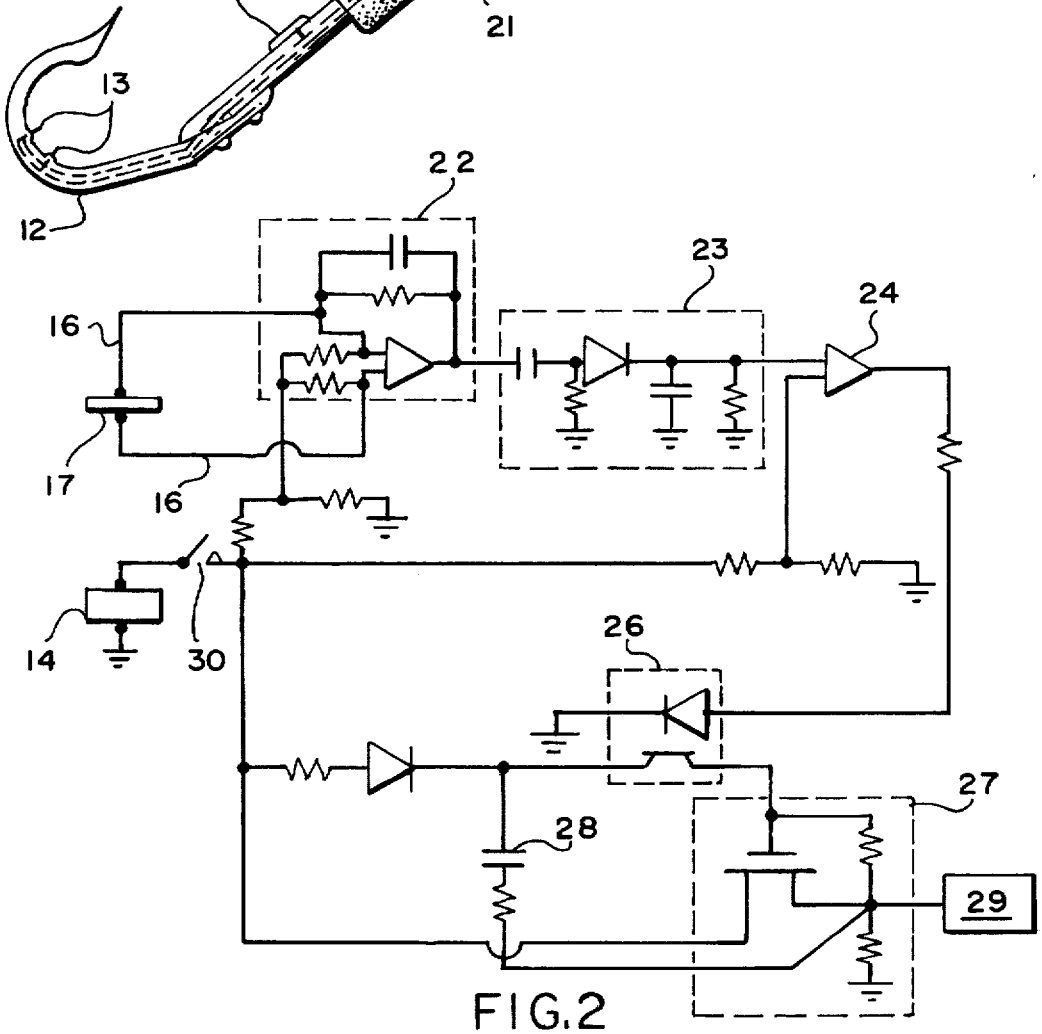
FIG. 2 is an electrical schematic circuit diagram which may be used in conjunction with the piezoelectric sensor and embodiments of FIGS. 1 and 7.

FIG. 2 is a diagram of the circuit 15 which may be used to generate the electrical pulse. When switch 18 is activated, the piezoelectric sensor 17, when flexed, produces a voltage. The voltage thereby produced is amplified by an operational amplifier 22 whose output is input to a rectifier-delay circuit 23 which negates a spurious signal from sensor 17. When a real signal is sent from sensor 17, the output of amplifier 22 is input to a first leg of comparitor 24. A second leg of comparitor 24 receives a signal from the power source 14. When the signal to a first leg exceeds the signal to a second leg of comparitor 24, comparitor 24 activates the optical isolator 26. Optical isolator 26 provides for a higher voltage to the field effect transformer (FET) 27 than the supply voltage from power source 14. A capacitor 28 stores a charge so that the FET is maintained in the on mode. Finally a stun generator 29 sends a very high voltage to the electrical contacts 13 which stuns the fish being gaffed. Other appropriate electrical circuits may be readily envisioned by one skilled in the art.

Figure 3:
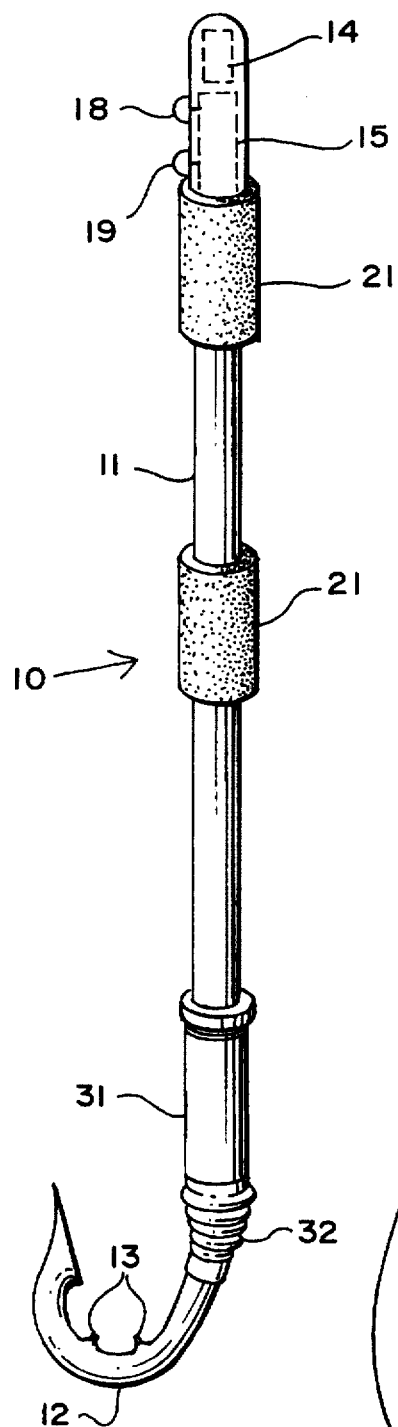
FIG. 3 is a schematic illustration of another embodiment of the stun gaff utilizing axial motion caused by the weight of the fish to generate the stunning voltage.
Figure 4:
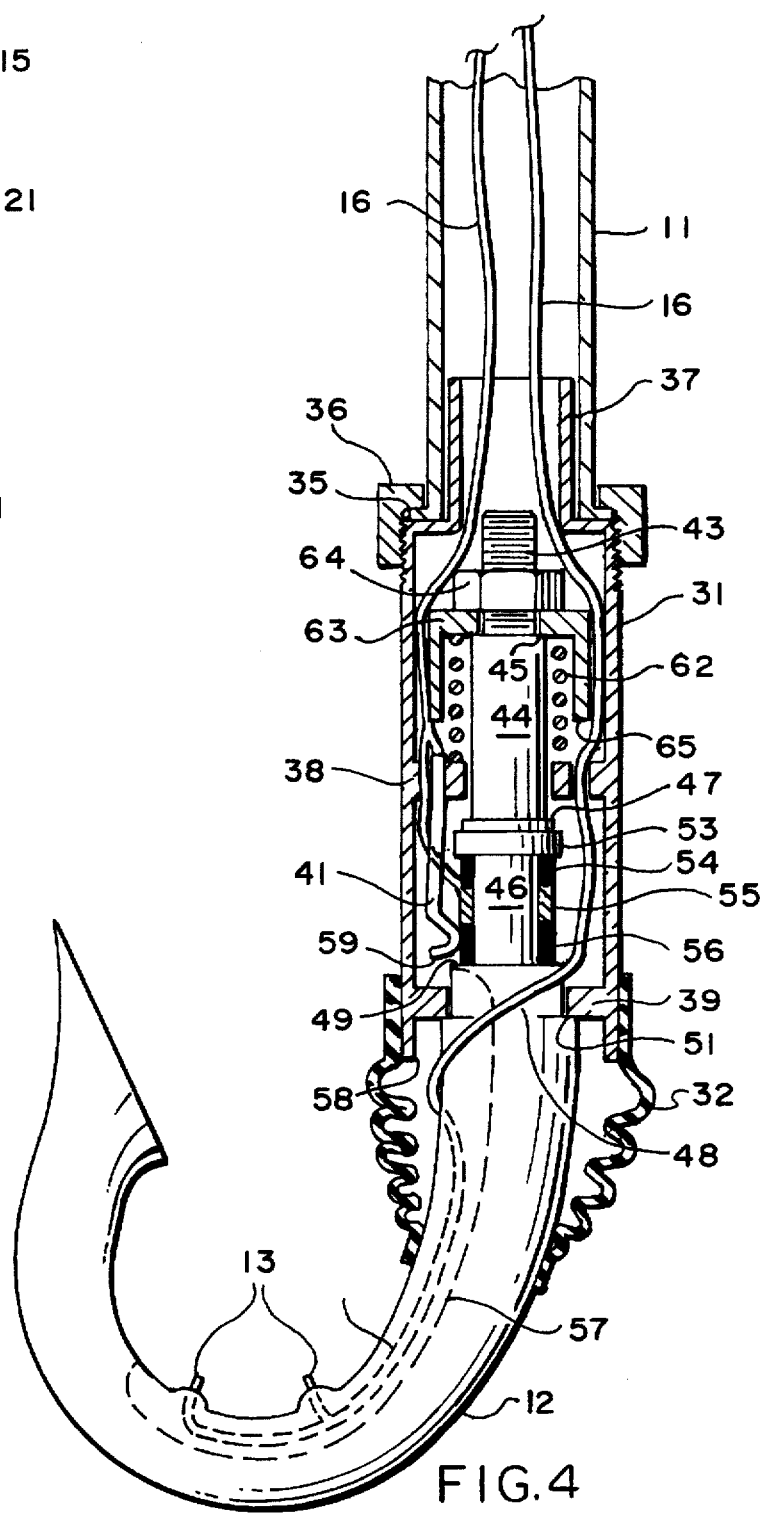
FIG. 4 is a detailed schematic of the mechanically operated embodiment of FIG. 3.

In FIGS. 3 and 4 another embodiment of the inventive stun gaff 10 is schematically shown. In this embodiment the weight of a fish mechanically triggers the electrical circuit which produces the stunning voltage. The gaff 10 comprises a handle 11, a hook member having a sharply pointed end 12, a coupling 31 and a waterproofing collar 32. Handle 11 may include a soft plastic foam material 21 to provide a non-slip grip. Handle 11 may be made from an appropriate metal such as a metal tube. A non-corrosive metal is preferable. Coupling 31 may also be made from a metal tube. Hook member 12 is preferably but not necessarily made from a solid non-corrosive metal. A pair of electrical contacts 13 is insulatingly mounted onto hook member 12. Again the power source 14 and the electrical circuit 15 may be located within the upper part of handle 11.

The stun gaff 10 of the embodiment of FIGS. 3 and 4 is utilized when a fish is brought alongside of a boat and it is desired to gaff the fish and bring it into the boat. At the time of gaffing, the pointed end of hook member 12 pierces the fish causing electrical contacts 13 to come into contact with the flesh of the fish. At that time the electrical circuit 15 internal to the gaff 10 is mechanically activated by the weight of the fish and/or the pulling force on the gaff, causing a high voltage to discharge across the electrical contacts 13 to momentarily stun and incapacitate the fish. An on-off switch 18 is located at the end of handle 11 which is used to energize the internal electrical circuit. Switch 18 does not cause an electrical discharge across contacts 13; it merely applies power to the electrical circuit 15. The weight of the fish or pulling force results in the electrical discharge. Another switch 19 is also provided on handle 11. Switch 19 allows for manual discharge of the high voltage across contacts 13.

FIG. 4 illustrates details of one mechanical arrangement which may be used to activate the electrical circuit 15. Handle 11 includes a flange 35 and a nut 36 at one end thereof. Coupling 31, at the upper end thereof, is necked down 37 to fit snugly within the inner diameter of handle 11. Nut 36 is threadingly engaged with threads 38 just below the neck 37 of coupling 31 so as to connect coupling 31 with handle 11. Coupling 31 includes a first guide 38 and a second guide 39. Guides 38 and 39 guide the axial movement of hook member 12 relative to coupling 31. A spring loaded electrical prong 41 is attached to the underside of guide 38. Prong 41 is connected to wire 16.

Hook member 12 includes a first threaded cylindrical portion 43, a second slightly larger smooth cylindrical portion 44 with a step 45 therebetween, a third still slightly larger threaded cylindrical portion 46 with a step 47 between portions 44 and 46, and a fourth still slightly larger smooth cylindrical portion 48 with a step 49 therebetween. The end of cylindrical portion 48 includes another step 51 between it and the curved portion 52 of hook member 12. The third threaded cylindrical portion 46 has mounted thereon a nut 53, an upper insulating ring 54, a contact ring 55 and a lower insulating ring 56.

One electrical wire 16 is connected to upper contact ring 53 The wire 16 is connected to a switch 30 associated with electrical circuit 15, the output of the stunning circuit being transmitted to electrical contacts 13. A groove or cutout 57 in hook member 12 provides for routing of wires 16 between contact ring 55, contacts 13 and circuit 15. Contacts 13 may be mounted onto a non-conducting substrate which along with wires 16 may be maintained within groove 57 by a mastic such as silicon rubber.

In connecting hook member 12 to coupling 31, the diametrically stepped portion thereof is fitted up and into the bottom end 58 of coupling 31 until step 51 rests against the bottom surface of guide 39. The ramped end portions 59 of contact 41 allows for insertion of the stepped diameters of hook member 12 therebetween. When step 51 contacts the underside of guide 39, an axial space exists between the underside of guide 38 and step 47. A spring 62 is fitted around smooth cylindrical portion 44 and onto the upper surface of guide 38. A collar 63 is fitted around and on top of spring 62. A nut 64 is threaded onto threaded portion 43 until collar 63 is seated against step 45. At this time spring 62 is slightly compressed while contact 41 is in contact with insulating ring 54 and there is an axial space between the end 65 of collar 63 and the upper surface of guide 38. Water sealing boot 32 may thereafter be secured between coupling 31 and hook member 12 by appropriate clamps.

When handle 11, coupling 31 and hook member 12 are connected as above described, hook member 12 is capable of moving axially downward in accordance with the space between the end 65 of collar 63 and the upper side of guide 38. When this movement occurs, contact 41 slides onto conducting ring 55 which completes the electrical circuit to switch 50 which activates circuit 15 and supplies stunning voltage to contacts 13. Such movement occurs during gaffing of a fish and pulling the stun gaff 10 upwards. The weight of the fish causes the axial movement. And, providing that switch 18 is closed, the high voltage generated by circuit 15 stuns and incapacitates the fish. Other movement inducement embodiments which trigger the stunning electrical pulse may be readily envisioned consistent with the teachings herein.

Figure 5:
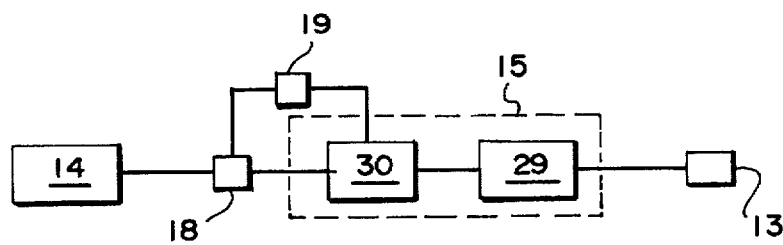
FIG. 5 is an electrical schematic circuit diagram which may be used with the embodiments of FIGS. 3 and 4.

The simplified electrical circuit shown in FIG. 5 may be used in conjunction with the apparatus of FIGS. 3 and 4. The movement of hook 12 by the weight of the fish serves to close the switch 30 which transmits the power from source 14 to stun generator 29 which powers the electrical contacts 13.

Figure 6:
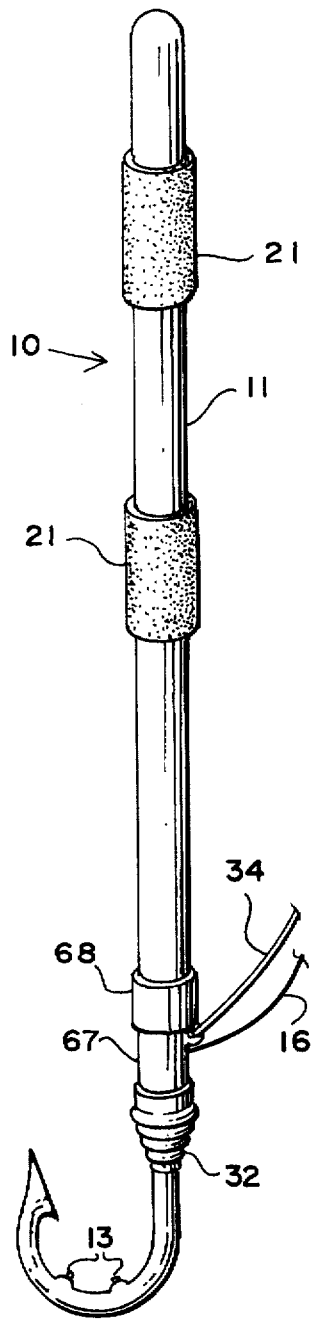
FIG. 6 is a schematic illustration of a flying gaff which may utilize either a mechanical activation or a piezoelectric or a combination thereof; and, FIG. 7 is a detailed schematic of one embodiment of the flying gaff of FIG. 6.
Figure 7:
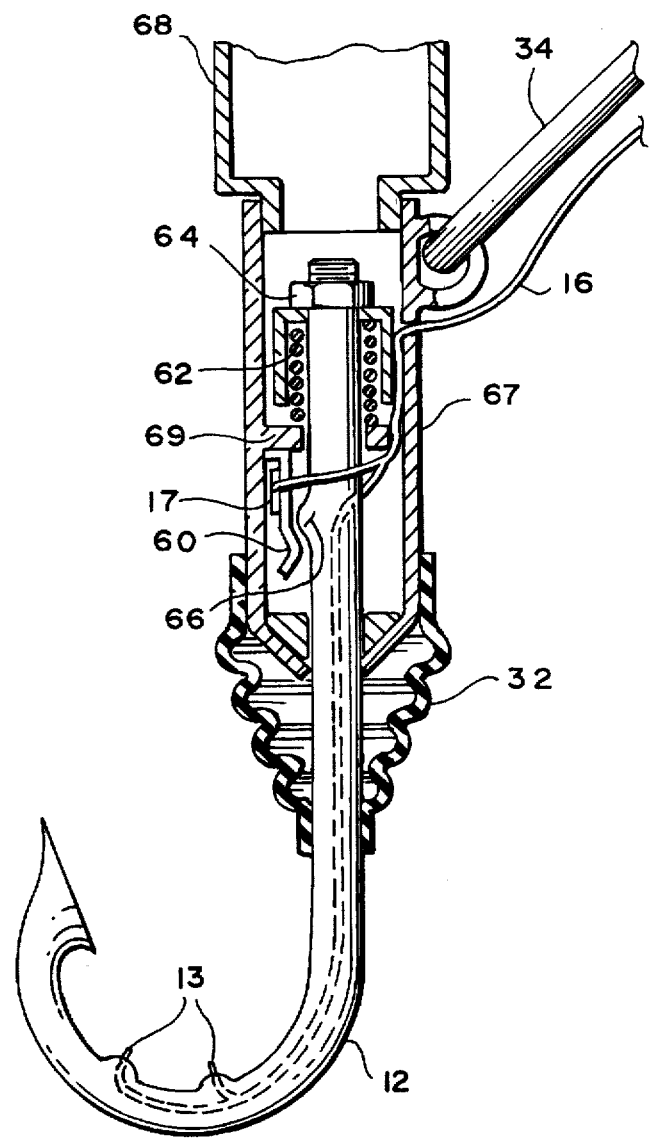

FIGS. 6 and 7 schematically illustrate the stun gaff 10 as applied to a flying gaff wherein the hook member 12 is detachable from the handle 11 such as by a friction coupling 68. Also attached to the hook 12 is a stout line 34. Once a fish is gaffed, the hook 12 detaches itself from the handle 11 and the fish is thereafter controlled by the stout line 34. In this embodiment, it is preferable that the electrical wires 16 be attached to line 34 and the electrical circuit 15 and the power source be located on board the boat. One or more switches 18 and 19 may still be located within handle 11. A separate pair of switches 18 and 19 may also be located on board the boat.

FIG. 7 illustrates details whereby the sensor 17 is attached to a prong 60 which is mounted onto a guide ring or collar 69. The shaft of hook 12 includes a protruding cam member 66 which serves to bend prong 60 when the weight of the fish compresses spring 62 and moves the hook downwardly within housing 67. The amount of force needed to compress spring 62 is less than the force needed to separate the hook 12 and housing from the handle 11. The electric circuitry of FIG. 2 may be used in conjunction with the embodiment of FIG. 7.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the scope of the breadth and scope of the claims here appended.

I claim as my invention:

1. A fishing gaff comprising in combination:
   a handle,
   a hook attached to the handle,
   a pair of electrodes attached to said hook,
   an electrical circuit operatively connected to said electrodes, said electrical circuit including
   a stun generator for developing a high voltage, and
   means attached to said gaff for activating said electrical circuit and producing high voltage across said electrodes.

2. The apparatus of claim 1 wherein said activating means comprises a piezoelectric sensor attached to said gaff.

3. The apparatus of claim 2 wherein said piezoelectric sensor is of a type which emits an electrical signal when flexed, said signal being input to a switch which activates said electrical circuit.

4. The apparatus of claim 3 wherein said piezoelectric sensor is attached to the handle of said gaff.

5. The apparatus of claim 2 wherein said electrical circuit further comprises an operational amplifier, a comparitor, an optical isolator and a field effect transformer.

6. The apparatus of claim 2 wherein said hook and said handle are connected for axial movement by a biasing spring between a nut and a collar, said piezoelectric sensor being attached to a prong which is attached to said collar, said hook including a protrusion operatively connected to said prong whereby movement of the hook causes contact between the prong and the protrusionion which flexes the prong and its attached sensor.

7. The apparatus of claim 1 wherein said activating means comprises a flange attached to said hook and a stop member attached to said handle with a biasing member therebetween.

8. The apparatus of claim 7 wherein said activating means further comprises electrical contact means for closing a switch when relative axial motion occurs between said handle and said hook.

9. The apparatus of claim 1 wherein said electrical circuit is enclosed within the handle of said gaff.

10. The apparatus of claim 1 wherein said hook is removably attached to said handle.

11. The apparatus of claim 10 including a line attached to said hook.

12. The apparatus of claim 1 wherein said electrical circuit is located separate from said gaff with electrical conducting wires between said circuit and said electrodes.

13. The apparatus of claim 1 wherein said activating means includes a switch for manually activating said electrical circuit.

14. The apparatus of claim 13 wherein said switch produces one or more pulsed electrical discharges across said electrodes.

* * * * *